US008897285B2

(12) United States Patent
Wang et al.

(10) Patent No.: US 8,897,285 B2
(45) Date of Patent: Nov. 25, 2014

(54) CHARACTERIZATION OF TEMPORARY IDENTIFIERS IN A WIRELESS COMMUNICATION NETWORK

(75) Inventors: Jiansong Wang, Naperville, IL (US); Ryan Redfern, Cerritos, CA (US); Jianrong Wang, Sammamish, WA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 704 days.

(21) Appl. No.: 12/856,232

(22) Filed: Aug. 13, 2010

(65) Prior Publication Data

US 2012/0039222 A1 Feb. 16, 2012

(51) Int. Cl.
*H04J 3/24* (2006.01)
*H04W 8/26* (2009.01)
*H04W 80/04* (2009.01)

(52) U.S. Cl.
CPC ............... *H04W 8/26* (2013.01); *H04W 80/04* (2013.01)
USPC .......................................... 370/349; 370/392

(58) Field of Classification Search
CPC .... H04W 80/04; H04W 8/26; H04L 29/0653; H04L 29/06095; H04L 49/3009; H04L 49/309; H04L 45/74; H04L 12/5601; H04L 47/621
USPC ............... 370/389, 349, 310.2, 328, 338, 392
See application file for complete search history.

(56) References Cited

U.S. PATENT DOCUMENTS

| 7,027,582 B2 * | 4/2006 | Khello et al. ............ 379/220.01 |
| 7,187,941 B2 * | 3/2007 | Siegel ........................... 455/519 |
| 7,801,133 B2 * | 9/2010 | Siegel ........................... 370/390 |
| 2004/0097235 A1 * | 5/2004 | Siegel ........................... 455/445 |

OTHER PUBLICATIONS

3GPP TS 23.003 V8.9.0 (Jun. 2010). Technical Specification 3rd Generation Partnership Project; Technical Specification Group Core Network and Terminals; Numbering, addressing and identification (Release 8).
3GPP TS 24.301 V9.3.0 (Jun. 2010) Technical Specification 3rd Generation Partnership Project; Technical Specification Group Core Network and Terminals; Non-Access-Stratum (NAS) protocol for Evolved Packet System (EPS); Stage 3 (Release 9).

* cited by examiner

*Primary Examiner* — Brenda H Pham
(74) *Attorney, Agent, or Firm* — Amin, Turocy & Watson, LLP

(57) ABSTRACT

System(s), device(s), and method(s) are provided to characterize a temporary identifier for user equipment (UE) in telecommunication procedure(s) in a wireless communication network. Based on radio technology of at least one serving node that enables at least part of the telecommunication procedure(s), the UE generates a TI and a classifier that discloses the type of the TI. The classifier enables distinguishing a TI value in a first radio technology from a TI value in a second radio technology. In addition the classifier enables a serving node that receives the classifier to identify a logic address of a disparate serving node without restriction in backwards compatibility amongst radio protocols utilized by the wireless communication network.

20 Claims, 8 Drawing Sheets

CHARACTERIZATION OF TEMPORARY IDENTIFIERS IN A WIRELESS COMMUNICATION NETWORK

TECHNICAL FIELD

The subject disclosure relates generally to wireless communications and, more particularly, to characterizing temporary identifiers for user equipment in telecommunication procedures in a wireless communication network.

BACKGROUND

With the introduction of LTE network architecture in 3GPP Release 8 (Rel. 8) standards, a new type of UE temporary identifier is defined by the standards body and used by the Mobility Management Entity (MME) to address a user equipment (UE) when the UE registers with the Evolved Packet Core. This UE temporary identifier is called the Globally Unique Temporary Identifier (GUTI). Please see TS 23.003 for the definition of the GUTI. Due to the UE mobility between GPRS and LTE networks, and between UMTS and LTE networks, the UE temporary identifiers used in each of these different 3GPP access technologies need to be mapped between each other, i.e. from RAI+P-TMSI (Routing Area Identifier+Packet-Temporary Mobile Station Identifier) to GUTI or from GUTI to RAI+P-TMSI.

Yet, the requirement in 3GPP LTE Rel. 8 standards for mapping amongst disparate temporary identifiers (TIs) is a non-backward compatible requirement, which poses operational issues for network operators with significant network deployments that exploit radio technologies different from LTE. At least one issue arising from the requirement for mapping TIs associated with disparate radio technologies is that Location Area Codes (LACs) are restricted to a specific domain of values. However, network operators that exploit radio technologies such as 3GPP UMTS, 3GPP GPRS, or CDMA2000, are likely to have deployments that exceed such a restriction on LAC values. Thus, transition to 3GPP LTE radio technology is likely to result in substantial network re-planning in order to make the LAC assignments compliant with the current 3GPP LTE Rel. 8 standards protocol(s). Yet, the cost of such re-planning is prohibitively high and can impact adversely the service provided to current end-users during radio-technology transition periods.

SUMMARY

The following presents a simplified summary of the subject disclosure in order to provide a basic understanding of some aspects thereof. This summary is not an extensive overview of the subject disclosure. It is intended to neither identify key or critical elements nor delineate any scope. Its sole purpose is to present some concepts of the various embodiments of the subject disclosure in a simplified form as a prelude to the more detailed description that is presented later.

One or more embodiments of the subject disclosure provide system(s), device(s), and method(s) to System(s), device(s), and method(s) to characterize a temporary identifier for user equipment (UE) in telecommunication procedure(s) in a wireless communication network. Based on radio technology of at least one serving node that enables at least part of the telecommunication procedure(s), the UE generates a TI and a classifier that discloses the type of the TI in the telecommunication procedure(s) (e.g., Registration procedure). The classifier enables distinguishing a TI value in a first radio technology from a TI value in a second radio technology. In addition the classifier enables a serving node that receives the classifier to identify a logical address of a disparate serving node without restriction in backwards compatibility amongst radio protocols utilized by the wireless communication network.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
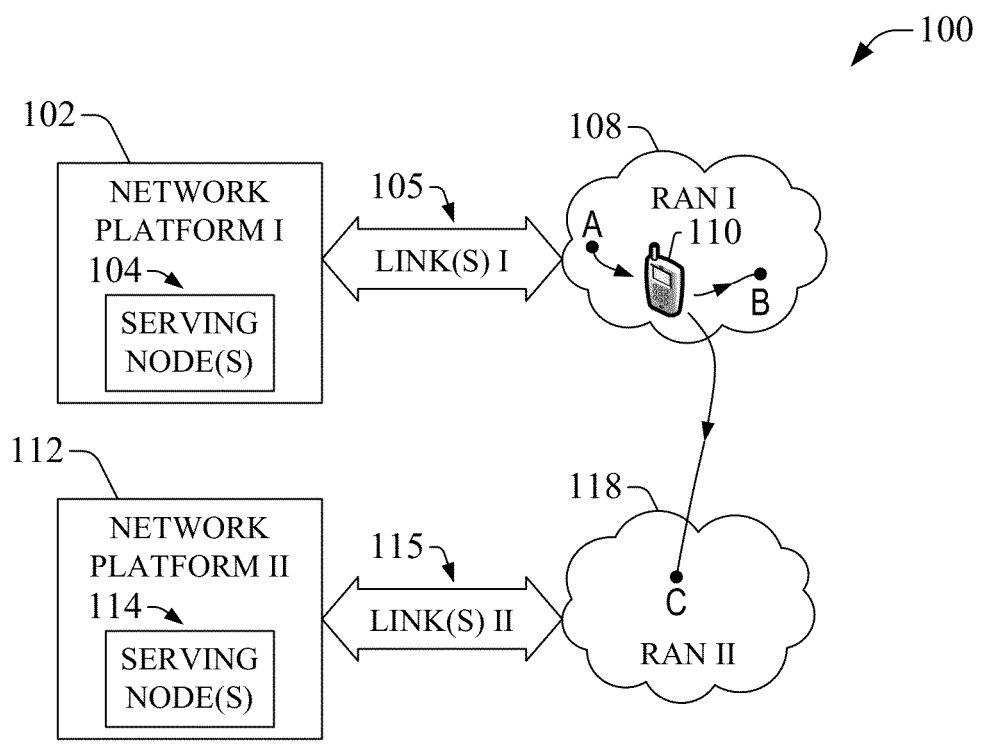
FIG. 1 presents an example wireless environment that enables characterization of temporary identifiers (TIs) for user equipment (UE) in accordance with aspects described herein.

The subject disclosure is now described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the subject disclosure may be practiced without these specific details. In other instances, well-known structures and devices are shown in block diagram form in order to facilitate describing the various embodiments of the subject disclosure.

As used in this application, the terms "component," "system," "platform," "layer," "node," "interface," and the like are intended to refer to a computer-related entity or an entity related to an operational apparatus with one or more specific functionalities, wherein the computer-related entity and the entity related to the operational apparatus can be either hardware, a combination of hardware and software, software, or software in execution. One or more of such computer-related entities or entities related to the operational apparatus are also referred to herein as "functional elements." As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, layer, node, interface, and the like.

Various aspects of the subject disclosure are presented in terms of systems or embodiments that may include a number of components, modules, nodes, interfaces, platforms, or the like. It is to be understood and appreciated that the various systems or embodiments may include additional components, modules, etc., and/or may not include all of the components, modules, nodes, interfaces, platforms, etc. discussed in connection with the annexed drawings. A combination of these approaches may also be used.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further yet, the term "set" as employed herein excludes the empty set. Thus, a "set" in the subject disclosure includes one or more elements or entities. As an illustration, a set of devices includes one or more devices, a set of recipients includes one or more recipients, a set of addresses can include K addresses with K a natural number greater than or equal to unity. In addition, as employed herein, the term "sub-set" can include the empty set. In the subject disclosure, it explicitly noted when a sub-set excludes the empty set.

Referring to the drawings, FIG. 1 presents an example wireless environment 100 that enables characterization of temporary identifiers (TIs) for user equipment (UE) in accordance with aspects described herein. A TI is radio technology specific and can be utilized in various telecommunication processes, such as mobility events (Tracking Area Update, Routing Area Update, Location Area Update, etc.) or registration events (e.g., Attach procedure). Telecommunication processes that exploit a TI (e.g., a Globally Unique Temporary Identifier (GUTI) in 3GPP LTE) generally involve transition from a first serving node (e.g., a mobility management entity (MME) in 3GPP LTE or a SGSN in 3GPP UMTS) to a second serving node.

Example wireless environment 100 includes two wireless networks that operate in accordance with respective radio technologies. As illustrated, a first wireless network includes network platform I 102 and one or more link(s) I 105 that functionally couple (e.g., communicatively couple) network platform I 102, and component(s) therein, to radio access network (RAN) I 108. The RAN I 108 comprises one or more outdoor-based (or outdoor) base stations, and associated electronic circuitry, and respective deployment site(s) of the one or more outdoor base stations. In addition, the RAN I 108 includes the air-interface, which comprises a least one wireless radio link operated in accordance with the base station(s) radio technology. Moreover, the RAN comprises various coverage cells or sectors. For a wireless device (e.g., UE 110) served by base station(s) (not shown) in RAN I 108, one or more network components that are part of a radio access network (not shown) associated with network platform I 102 enable transmission of data and signaling. Network platform I 102 includes a set of one or more serving node(s) 104, wherein a serving node (e.g., a Mobility Management Entity (MME) in 3GPP LTE network) in such set can exchange (e.g., transmit and receive) traffic and control signaling to UE 110. A serving node is logically specific to the radio technology utilized for telecommunication by a wireless network; in certain scenarios, the serving node also can be physically specific to such radio technology.

In addition, a second wireless network includes a network platform II 112 functionally coupled (e.g., communicatively coupled) to RAN II 118 via one or more link(s) 115. RAN II 118 comprises one or more outdoor-based (or outdoor) base stations, and associated electronic circuitry, and respective deployment site(s) of the one or more outdoor base stations. In addition, RAN II 118 includes the air-interface, which comprises a least one wireless radio link operated in accordance with the base station(s) radio technology. Moreover, the RAN comprises various coverage cells or sectors. For a wireless device (e.g., UE 110) served by base station(s) (not shown) in RAN II 118, one or more network components that are part of a radio access network (not shown) associated with network platform II 112 enable transmission of data and signaling. Network platform II 112 includes a set of one or more service node(s) 114; a serving node in such set can exchange traffic and control signaling with user equipment in RAN II 118. While illustrated as separate entities, RAN I 108 and RAN II 118 can overlap, at least in part, with one or more base stations associated with RAN I 108 being deployed in areas in which base stations associated with RAN II 118 also are deployed.

A telecommunication process related to UE 110 can be an intra radio access technology (intra RAT) process or an inter RAT process. An intra-RAT telecommunication process typically occurs within a single RAN, whereas an inter-RAT telecommunication process involves at least two disparate RANs. As an example, a mobility event (indicated with arrows) of UE 110 within RAN I 108, such as relocation of UE 110 from location A to location B, is a intra-RAT mobility event. Such intra-RAT mobility event generally exploits a TI that is native to the radio access technology related to RAN I 108. In contrast, a mobility event of UE 110 that entails relocation of UE 110 from location A in RAN I 108 to location C in RAN II 118 is an inter-RAT process that typically exploits two values of TIs; each value of TI is associated with a respective domain of unique network identifiers. In an aspect of the subject innovation, a domain of unique network identifiers can be radio technology specific (e.g., dictated by a standardized protocol of radio telecommunication). In another aspect, deployment architecture of a wireless network (service nodes, base stations, etc.) can determine the domain of unique network identifiers; for instance, a large deployment of a macrocellular network can have a range of allowed Location Area Codes (LACs) suitable for the size of deployed base stations and related serving nodes.

In the subject innovation, UE 110 can issue, or generate, a TI and a related indication of the type of identity of the TI. In an embodiment, the type of identity can be part of a TI information element (IE) and be defined as a set of bits within the TI IE. In such embodiment, to issue the type of identity, UE 110 via one or more components therein can encode a field within the TI IE. In another embodiment, the type of identity can be a dedicated tag linked to the TI; UE 110 or one or more components therein can determine a value of the dedicated tag.

Figure 2:
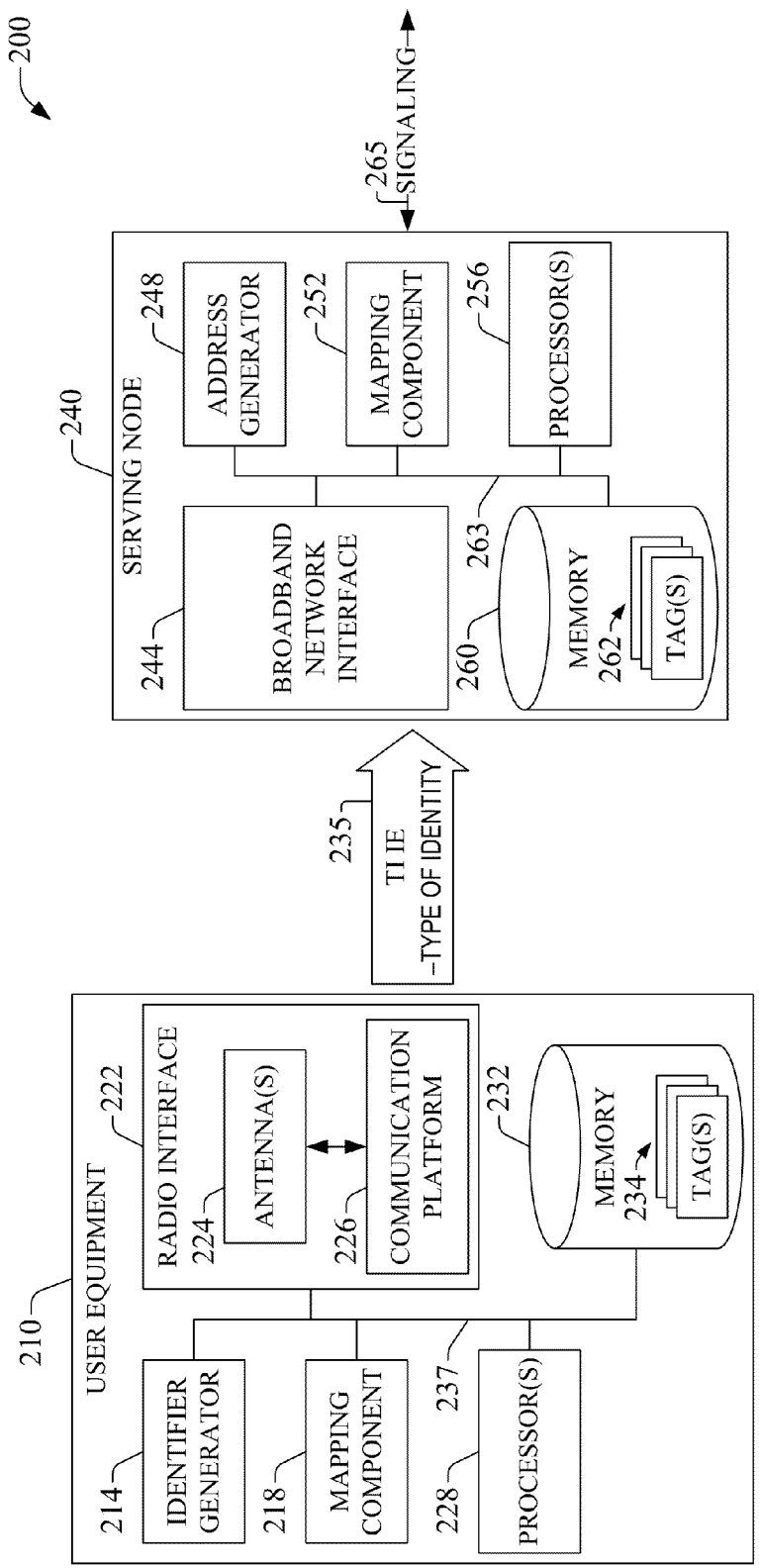
FIG. 2 is a block diagram of an example system that enables characterization of a temporary identifier for a UE in accordance with aspects described herein.

FIG. 2 is a block diagram of an example system 200 that enables characterization of a temporary identifier for a UE in accordance with aspects described herein. As indicated supra, the TI can be employed as part of various telecommunication processes. The telecommunication process can be most any procedure that involves the UE and at least one serving node (e.g., a MME or a SGSN), and relies at least in part on extracting or distinguishing a unique identifier for UE in a first radio technology (e.g., 3GPP LTE) from a unique identifier for the UE in a second technology (3GPP UMTS). In addition, the telecommunication process can be UE-centric or serving-node-centric, wherein the UE-centric procedure or the serving-node-centric relies at least in part on extracting or extinguishing a unique identifier for UE in a first radio technology (e.g., 3GPP LTE) from a unique identifier for the UE in a second technology (e.g., 3GPP UMTS). The example system 200 includes a UE 210 and a serving node 240. UE 210 can embody any UE described herein while serving node 240 can embody at least one serving node in the set of one or more serving nodes 104 or 114. UE 210 includes an identifier generator component 214 that can issue (e.g., encode and commit to memory) a TI (e.g., GUTI in 3GPP LTE radio technology or P-TMSI in 3GPP UMTS radio technology) and can configure (e.g., encode and commit to memory) a classifier that characterizes the type of identity associated with the TI. In the subject specification and annexed drawings, identifier generator component 214 is also referred to as identifier generator 214.

Based on a telecommunication process (e.g., Tracking Area Update (TAU) procedure, Location Area Update (LAU) procedure, Routing Area Update (RAU) procedure, or Attach procedure), identifier generator 214 can determine a current radio technology associated with a current serving node (e.g., serving node 240) and a disparate radio technology associated with a new serving node. In a scenario in which the current radio technology associated with the current serving node is the same as the new radio technology associated with the new serving node, identifier generator 214 issues a TI that is specific to the current radio technology. In addition, identifier generator 214 can set a type-of-identity classifier associated with the TI to a value (e.g., "Native TI") that conveys the TI is intrinsic to the current radio technology. In one or more embodiments, the type-of-identity classifier associated with the TI can be encoded within a field in a TI IE (e.g., Evolved Packet System (EPS) Mobility Identity IE in 3GPP LTE) related to the TI (e.g., GUTI); identifier generator can encode the type-of-identity classifier. Encoding of the field in the TI IE conveys the type of identity of the TI associated with the classifier. Identifier generator can encode a value of a type-of-identity classifier within the Type of Identity field within an octet of the standardized EPS Mobility Identity IE. In the subject disclosure, as an example, a value of the type-of-identity classifier can be "Mapped GUTI"; UE 210, via identifier generator 214, for example, can encode the "Mapped GUTI" value as "111" in bits 3 to 1 of octet 3 in EPS Mobility Identity IE. As another example, UE 210, via identifier generator 214, can encode the "Mapped GUTI" value as "101". It should be appreciated that the value "Mapped GUTI" supplements the values "IMSI" and "Native GUTI" that are available in conventional 3GPP LTE networks (e.g., 3GPP LTE Release 8 networks). It should be further appreciated that with bits 3 through 1 in octet 3 in EPS Mobility Identity IE, there is a plurality of six ($6=2^3-2$) possible 3-bit encodings for Type of Identity field in addition to the two conventional 3-bit encodings (e.g., 3GPP LTE Rel. 8 encodings).

It should be appreciated that in the subject disclosure, a type-of-identity classifier or any indication the indication of TI type can be encoded in a multi-bit field (e.g., an M-bit field, with M a positive integer) within a TI information element (IE) related to a TI associated with the TI type. Accordingly, the subject innovation affords $2^M$ distinct encodings of the M-bit field. Such plurality of one or more distinct classifiers enables identification of up to M distinct types of temporary identifiers. It should be appreciated that at least one of the M distinct types of temporary identifier defined by the M-bit field and related encoding can have a mapping associated thereto, wherein the mapping relates a value of the TI linked to the type-of-identity classifier to a value of a unique identifier within a range of values dictated by a radio technology different from the radio technology intrinsic (or native) to the value of the TI linked to the type-of-identity classifier. It should also be appreciated that while a "Type of Identity" classifier need not be encoded in a TI IE (e.g., TI IE 235). In certain embodiments, a type-of-identity classifier associated with a TI, and related value, can be conveyed independently from a TI IE.

In addition, in certain embodiments, as described supra, the type-of-identity classifier can be a dedicated tag associated to an issued TI; identifier generator 214 can determine a value of the dedicated tag. In an aspect, identifier generator 214 can select a tag from a set of tags (e.g., tag(s) 234) retained in memory 232. Definition of the type-of-identity classifier as a tag rather than as a field within a conventional TI IE, e.g., EPS Mobility Identity IE, can extend applicability of such classifier to wireless networks (e.g., CDMA2000 networks) that do not exploit conventional TI IEs, but utilize temporary identifiers (TIs) in telecommunication procedures that include serving nodes, or other network nodes, that operate in accordance with disparate radio technologies.

In scenarios in which a current serving node (e.g., a Serving GPRS Support Node (SGSN) in a 3GPP UMTS network) operates in accordance with a first radio technology (e.g., 3GPP UMTS) that is different from a second radio technology (e.g., 3GPP LTE) associated with a new serving node (e.g., an MME in an Evolved Packet Core (EPC) network), UE 210 can produce a TI based on a mapping that associates a first identifier (e.g., RAI+P-TMSI) in the first technology with a second identifier (e.g., GUTI) in the second technology. In an aspect, mapping component 218 can associate the first identifier to the second identifier through a mapping (not shown). The mapping (not shown) can be retained in memory 232. After a TI is produced, identifier generator 214 can issue a classifier that characterizes the TI (e.g., GUTI). The new serving node that receives a TI and the classifier can identify the contents of the TI through the classifier.

User equipment 210 can deliver a TI IE and a related type-of-identity classifier to serving node 240. To at least such end, identifier generator 214 can generate a TI IE (e.g., temporary identifier IE 235) and convey the TI IE to radio interface 222 for delivery. In an aspect, delivery can be indirect, via at least one base station and/or at least one network node. In one or more embodiments, a classifier (e.g., "Type of Identity") that determines type of identity of the TI is encoded in the TI IE. In additional or alternative embodiments, identifier generator 214 can convey the classifier (e.g., "Type of Identity") to radio interface 222 separately from the TI IE; radio interface 222 can deliver the TI IE and the classifier. Radio interface 222 includes antenna(s) 224 and communication platform 226. Antenna(s) 224 can receive and transmit electromagnetic (EM) radiation with wavelengths in at least the radiofrequency or microwave portion of the EM spectrum; received EM radiation is conveyed to communication platform 226 for processing. Communication platform 226 comprises electronic components and associated circuitry that provides for processing and manipulation of received signal(s) and signal(s) to be transmitted, wherein such signal(s) are received or transmitted in suitable portions of the EM spectrum. The electronic components and circuitry can include a set of one or more chipsets that enable digital-to-analog/analog-to-digital conversion, multiplexing/demultiplexing signal(s), coding/decoding signal(s), and the like in accordance with a radio telecommunication protocol associated with a radio technology (3GPP LTE, 3GPP UMTS, etc.). In one or more embodiments, communication platform 226 can include circuitry (e.g., one or more chipsets; not shown) and a processor (a processor that is part of processor(s) 228) to switch radio technology based at least on radio technology exploited by an intended recipient of a communication of a source of a communication. In an aspect, the communication platform 226 can switch radio technology within a configurable and upgradable set of technologies in order to effect radio telecommunication.

Serving node 240 receives a TI IE 225 and the related classifier that characterizes the type of identity of a TI encoded in the TI IE. In an aspect, a broadband network interface 244 receives (e.g., collects and decodes data) the TI IE and the related classifier. In response to reception of the TI IE 225 and the related classifier, serving node 240 can extract a logical address (e.g., an internet protocol (IP)) for a disparate serving node (not shown) related to the telecommunication that exploits the TI and the related classifier. In one or more embodiments, serving node 240 can extract the logical address of the disparate serving node through, at least in part, an external resolution server (e.g., a Domain Name Server; not shown in FIG. 2). In an aspect, address generator 248 can access (e.g., query) the external resolution server and, in response to such access (e.g., in response to the query), address generator 248 can receive the logical address of the disparate serving node. In additional or alternative embodiments, serving node 240 can extract the logic address through a procedure, or mechanism, that is internal to serving node 240. In another aspect, address generator 248 can implement (e.g., execute) such procedure, which can be retained within memory 222 as one or more sets of computer-executable code instructions. Address generator component 248 determines (e.g., decodes) a value of the classifier associated with the TI. In the subject specification and annexed drawings, address generator component 248 is also referred to as address generator 248. In case the classifier conveys that the TI is defined in accordance with the radio technology employed by serving node 240, address generator 248 decodes at least one value conveyed by the TI and utilizes the at least one value to extract, or identify, a logical address of the disparate serving node. In the alternative, in case the classifier related to the received TI IE conveys that the TI is to be linked to a domain of unique network identifiers for a radio technology distinct from the domain of unique network identifiers for the radio technology utilized by serving node 240, address generator 248 can exploit mapping component 252 to identify a logic address of a disparate serving node. In an aspect, based on the value of the classifier related to the received TI IE 225, mapping component 252 extracts a mapped unique identifier for the received TI value. In an aspect, mapping component 252 can exploit value of a tag that embodies the classifier to identify a mapping (not shown) to extract the mapped unique identifier for the received TI value. One or more tag(s) 262 can be retained in memory 260 can be linked to one or more mappings (not shown); linkage can be through a one-to-one relationship, one-to-many relationship, or many-to-many relationship. The mapped unique identifier enables address generator 248 to identify the logic address of the disparate serving node. In an aspect, to extract a mapped unique identifier for the received TI value, mapping component 252 can exploit one or more mappings that associate a received TI value with a unique identifier in a range of values dictated by a disparate radio technology from the radio technology intrinsic (or native) to the TI value. The one or more mappings (not shown) are retained in memory 260. The one or more mappings are configurable and can be determined by a network operator.

As part of the telecommunication process related to reception of TI IE 235 and associated classifier that characterizes the type of identity of a TI encoded in the TI IE 225, serving node 240 can convey signaling 265 to a disparate serving node (not shown). At least part of the signaling 265 can include a request for information related to such telecommunication process. As an example, if the telecommunication process is a tracking area update (TAU) procedure, the request for information conveyed to the disparate serving node (not shown) can be a packet data protocol (PDP) context request.

UE 210 includes processor(s) 228 configured to provide or that provide, at least in part, functionality to substantially any or any component, interface, layer(s), or other functional element(s) within the UE 210. To provide at least such functionality, processor(s) 228 can execute computer-executable code instructions retained in memory 232, wherein the computer-executable code instructions can be retained, for example, in application storage (not shown) within memory 232. In particular, though not exclusively, to provide at least a part of the functionality of the various functional elements of UE 210, processor(s) 228 can implement (e.g., execute) one or more of the example methods described in the subject specification.

In UE 210, functional elements, e.g., components, interfaces, layer(s), can be mutually and functionally connected via bus 237. Such functional elements are also connected to memory 232 via bus 237. Processor(s) 228 also can be functionally connected to components, interfaces, layer(s), or substantially any or any functional elements that are part of UE

210. Bus 237 enables data or information exchange amongst the functional elements that it functionally connects. Such data or exchange of information allows, at least in part, numerous functional aspects of UE 210. In an aspect, bus 237 can be embodied in at least one of a memory bus, a system bus, an address bus, a message bus, or any other conduit, protocol, or mechanism for data or information exchange among components that execute a process or are part of execution of a process. In addition, bus 237 can include a power bus.

In particular, though not exclusively, processor(s) 228 is operationally coupled, through bus, to radio telecommunication interface 222 (also referred to herein and in annexed drawings as radio interface 222), and can enable at least part of one or more operations on data (e.g., packets, symbols, bits, or chips) that can enable telecommunication in accordance with a radio technology and associated protocol(s). Processor(s) 228 can afford at least part of multiplexing/demultiplexing operation(s), modulation/demodulation operation(s), coding/decoding operation(s), or the like. Such operations can include, for example, effecting direct and inverse fast Fourier transforms, selection of modulation rates, selection of data packet formats, inter-packet times, etc.

Moreover, processor(s) 228 is functionally connected, through bus 237, to memory 232 in order to store and retrieve information such as computer-executable code instructions, data structures, etc., necessary to operate or provide functionality, at least in part, to communication platform 226, identifier generator 214, mapping component 218, or other functional elements of UE 210. In addition to illustrated memory elements, memory 232 also can store, for example, data structures, code instructions and program modules, or substantially any type of software applications or at least part of firmware application (e.g., device logic); telecommunication protocol(s); operating system or device information; code sequence hypotheses, and modulation and multiplexing hypotheses; spreading and pilot codes; and so on. Furthermore, memory 232 also can retain content(s) (e.g., end-user or application data, data generated by other devices, or the like); security credentials (e.g., passwords, encryption keys, digital certificates, biometric reference indicators like voice recordings, iris patterns, fingerprints); or the like.

In one or more alternative or additional embodiment(s), processor(s) 228 can be distributed amongst one or more components of UE 210. In further one or more alternative or additional embodiments, one or more components of UE 210 can be implemented as software application(s) or firmware application(s) and can reside within memory 232 (or any computer-readable storage medium functionally coupled to UE 210) as one or more sets of computer-executable code instructions that, when executed by processor(s) 228, implement the one or more components and functionality of UE 210 as described herein.

While not shown, UE 210 can include a power supply (e.g., a Li-based battery), which can be removable or fixed. The power supply (not shown) can be rechargeable and can be connected to auxiliary sources of power such as a photovoltaic panel.

Serving node 240 includes processor(s) 256 configured to provide or that provide, at least in part, functionality to substantially any or any component, interface, layer(s), or other functional element(s) within serving node 240. To provide at least such functionality, processor(s) 256 can execute computer-executable code instructions retained in memory 260, wherein the computer-executable code instructions can be retained, for example, in application storage (not shown) within memory 260. In particular, though not exclusively, to provide at least a part of the functionality of the various functional elements of serving node 240, processor(s) 256 can implement (e.g., execute) one or more of the example methods described in the subject specification.

In serving node 240, functional elements, e.g., components, interfaces, layer(s), can be mutually and functionally connected via bus 263. Such functional elements are also connected to memory 260 via bus 263. Processor(s) 256 also can be functionally connected to components, interfaces, layer(s), or substantially any or any functional elements that are part of serving node 240. Bus 263 enables data or information exchange amongst the functional elements that it functionally connects. Such data or exchange of information allows, at least in part, numerous functional aspects of serving node 240. In an aspect, bus 263 can be embodied in at least one of a memory bus, a system bus, an address bus, a message bus, or any other conduit, protocol, or mechanism for data or information exchange among components that execute a process or are part of execution of a process. In addition, bus 263 can include a power bus.

In particular, though not exclusively, processor(s) 256 is operationally coupled, through bus 263, to broadband network interface 244 and can enable at least part of one or more operations on data (e.g., packets, symbols, bits, or chips) that can allow telecommunication in accordance with a radio technology and associated protocol(s).

Moreover, processor(s) 256 is functionally connected, through bus 263, to memory 260 in order to store and retrieve information such as computer-executable code instructions, data structures, etc., necessary to operate or provide functionality, at least in part, to broadband network interface 244, address generator 248, mapping component 252, or other functional elements of serving node 240. In addition to illustrated memory elements, memory 260 also can store, for example, data structures, computer-executable code instructions and computer program modules, or substantially any type of software applications or at least part of firmware application (e.g., device logic); telecommunication protocol(s); operating system or device information; and so on. Moreover, memory 260 can include one or more mappings (not shown) that enable, at least in part, mapping component 252 to associated a first identifier (e.g., a TI) in a first radio technology with a second identifier (e.g., RAI, P-TMSI) in a second radio technology. Furthermore, in certain embodiments, memory 260 also can retain content(s) (e.g., end-user or application data, data generated by other devices, or the like); security credentials (e.g., passwords, encryption keys, digital certificates, biometric reference indicators like voice recordings, iris patterns, fingerprints); or the like.

In one or more alternative or additional embodiment(s), processor(s) 256 can be distributed amongst one or more components of serving node 240. In further one or more alternative or additional embodiments, one or more components of serving node 240 can be implemented as software application(s) or firmware application(s) and can reside (e.g., be stored) within memory 260 (or any computer-readable storage medium functionally coupled to serving node 240) as one or more sets of computer-executable code instructions that, when executed by processor(s) 256, implement the one or more components and related functionality of serving node 240 as described herein.

Figure 3:
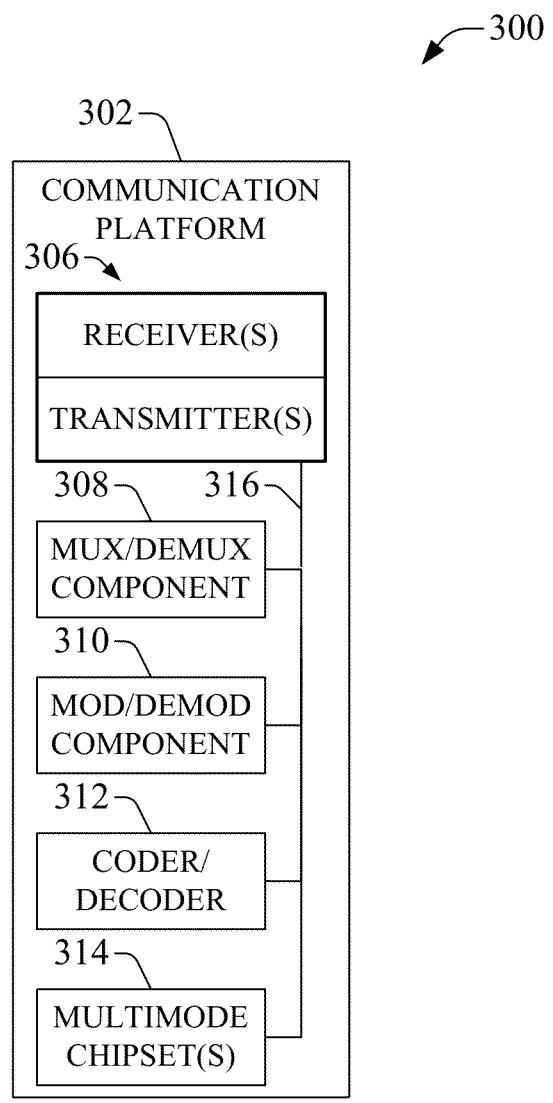
FIG. 3 illustrates a block diagram of an example embodiment of a communication platform that is part of a radio telecommunication interface within a UE in accordance with aspects described herein.

FIG. 3 illustrates a block diagram of an example embodiment 300 of a communication platform that is part of a radio telecommunication interface within a UE (e.g., 210) in accordance with aspects described herein. Communication platform 302 includes receiver(s)/transmitter(s) 306 that can convert signal(s) from analog to digital upon reception, and from digital to analog upon transmission. Signals that are received or converted to be transmitted have wavelengths in the radiofrequency or microwave portion of the EM spectrum. In addition, based upon antenna structure (e.g., antenna(s) 224; not shown in FIG. 3) and radio telecommunication protocol, receiver(s)/transmitter(s) 306 can divide a single data stream into multiple, parallel data streams, or perform the reciprocal operation. For communication platform 302, signals that are received or converted to be transmitted have wavelengths in the visible to microwave portion of the EM spectrum. Wavelengths of EM radiation manipulated (e.g., received, transmitted, or processed) by communication platform 302 can be determined at least in part by a network administrator that deploys a wireless network.

In communication platform 302, coupled to receiver(s)/transmitter(s) 306 is a multiplexer/demultiplexer component 308 that enables manipulation in time and frequency domain of received signal(s) or signal(s) to be transmitted via a radio telecommunication interface, such as radio telecommunication interface 222 (not shown in FIG. 3). Electronic mux/demux component 308 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, based on telecommunication protocol employed for radio telecommunication, mux/demux component 308 can scramble and spread information (e.g., codes) according to substantially any code known in the art; e.g., Hadamard-Walsh codes, Baker codes, Kasami codes, polyphase codes, and so on. A modulator/demodulator (mod/demod) component 310 is also a part of communication platform 302, and can modulate information according to multiple modulation techniques, such as frequency modulation, amplitude modulation (e.g., M-ary quadrature amplitude modulation (QAM), with M a positive integer), phase-shift keying (PSK), and the like. Mod/demod component 310 also can demodulate information processed in accordance with the foregoing modulation techniques.

Coder/decoder component 312 can process signal(s) that are received or that are to be transmitted in accordance with a radio telecommunication protocol. In an aspect, decoding can be based at least in part on blind decoding of received signal(s), computation of log-likelihood ratios (LLR) associated with constellation realization for a specific demodulation; maximum likelihood (ML) estimation, minimum mean square equalization (MMSE), zero forcing (ZF) filtering, or maximal ratio combining (MRC) filtering. Multi-mode chipset(s) 314 enable communication platform 302, and component(s) or functional elements therein, to operate in one or more radio technologies.

Functional elements, e.g., component(s), coder/decoder, receiver(s)/transmitter(s), are functionally connected via bus 316. Bus 316 enables exchange of data, signaling, or any other information, amongst the functional elements connected through such bus. In an aspect, bus 316 can be embodied in at least one of a memory bus, a system bus, an address bus, a message bus, or any other conduit, protocol, or mechanism for data or information exchange among components that execute a process or are part of execution of a process. In addition, bus 316 can include a power bus.

Figure 4:
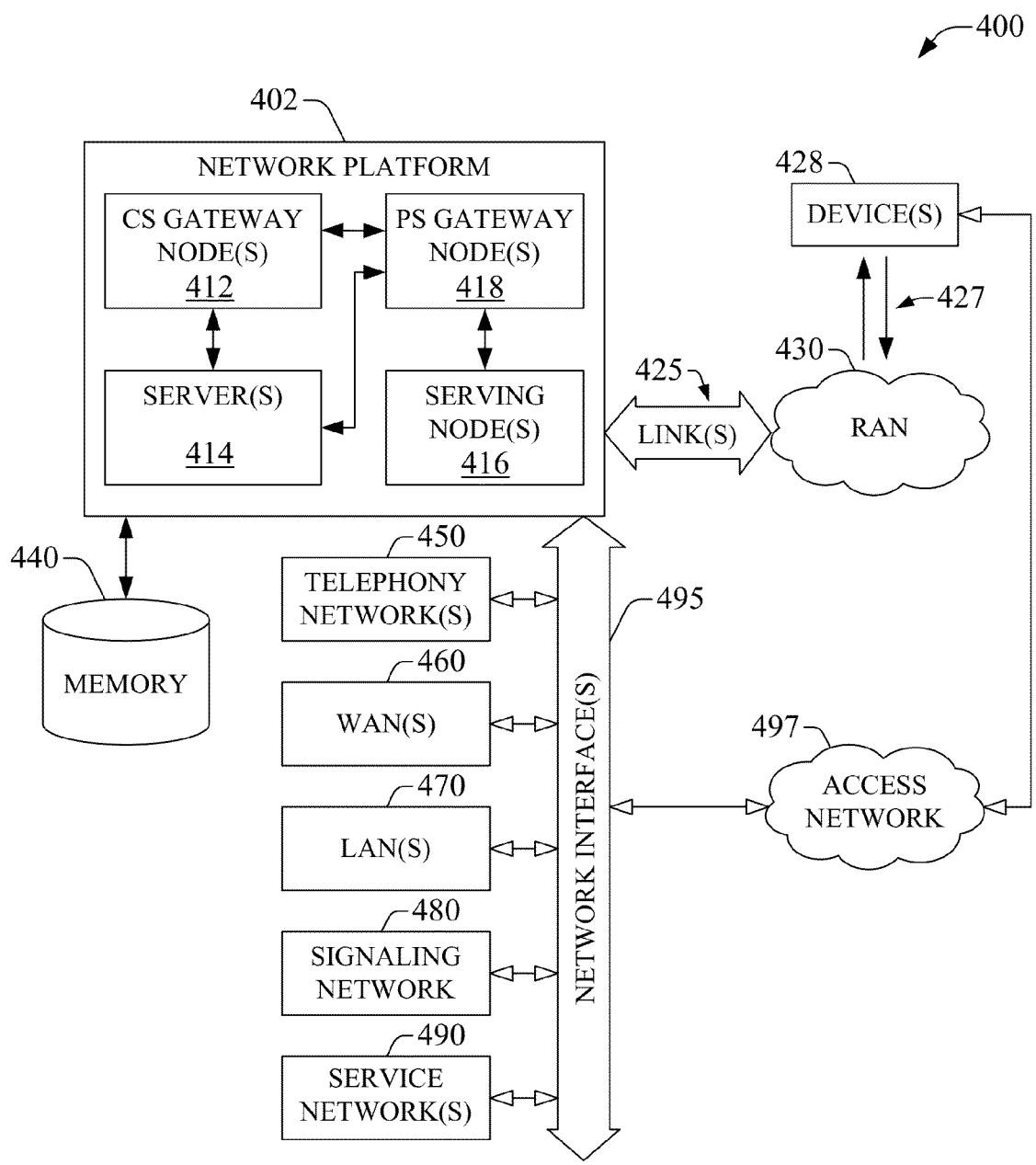
FIG. 4 presents a high-level block diagram of an example network environment that can enable aspects described herein.

FIG. 4 presents a high-level block diagram of an example network environment 400 that can enable implementation and exploitation of various aspects described in the subject disclosure. In example wireless environment 400, network platform 402, can embody network platform I 102 or network platform II 112, or substantially any network platform described herein; component(s), interface(s), and other functional element(s) of network platform 402 can be logically specific to a radio technology. Network platform 402 can include one or more functional elements, e.g., component(s), node(s), gateway node(s), interface(s), server(s), or platform(s) that enable both packet-switched (PS) (e.g., internet protocol (IP), frame relay, asynchronous transfer mode (ATM)) and circuit-switched (CS) traffic (e.g., voice and data) and control generation for networked communication, wireless or otherwise. It should be appreciated that in cellular wireless technologies (e.g., 3GPP UMTS, HSPA, 3GPP LTE, 3GPP UMTS, 3GPP2 UMB), network platform 402 embodies a core network. PS gateway node(s) 418 can embody at least part the PS domain. Functional element within the PS domain can enable exchange of notifications, indications, and directives in accordance with various networked communication protocols indicated herein, including one or more peer-to-peer transport protocol(s). With respect to CS communication, macro network platform 108 includes CS gateway node(s) 412, which can interface CS traffic received from legacy networks like telephony network(s) 450 (e.g., public switched telephone network (PSTN), or public land mobile network (PLMN)) or a signaling network 480. CS gateway node(s) 412 also can enable exchange of messaging communications in SMS protocol. In addition, CS gateway node(s) 412 can authorize and authenticate traffic (e.g., voice) arising from such networks. Moreover, CS gateway node(s) 412 can access mobility, or roaming, data generated through signaling network 480 in response to various mobility events as described herein; for instance, the mobility data can be stored in a VLR, which can reside in memory 440. Furthermore, CS gateway node(s) 412 can interface CS-based traffic or signaling with PS gateway node(s) 418. As an example, in a 3GPP UMTS network, CS gateway node(s) 412 can be embodied, at least in part, in gateway GPRS support node(s) (GGSN).

In the subject disclosure, in addition to receiving and processing CS-based traffic and signaling data, PS gateway node(s) 418 can authorize and authenticate PS-based data sessions with device(s) 428 served through RAN 430 via link(s) 425 and link(s) 427, which include wireline links (e.g., reference links) or wireless link(s) (e.g., line-of-sight (LOS) links). Device(s) 428 is a set of devices that includes wireless device(s), wireline device(s), or a combination thereof. For example, device(s) 428 can include a mobile device of a subscriber that exploits customized communication routing as described herein, and a set of wireline devices that operate within service coverage area served by a base station that can operate in accordance with one or more radio technologies.

Radio access network (RAN) 430 can include one or more components that enable transmission of data and signaling, including related payload data, amongst device(s) 428 and network platform 402. RAN 430 can include a radio access network (RAN), and associated component(s). For wireline devices, one or more components that are part of a wireline network (e.g., service network(s) 490) enable the transmission of data and signaling. Link(s), represented with open arrows, operationally connected to network interface(s) 495 can deliver data and signaling to the wireline device via the one or more components of the wireline network, for example represented by access network 497, and related link(s) represented with open arrows connecting the access network 497 to device(s) 428. Data sessions (e.g., voice calls, data calls . . . ) can include traffic exchange with networks external to network platform 402, such as wide area network(s) (WAN(s)) 460 or service network(s) 490; local area network(s) (LAN(s)) 470 (e.g., enhanced 911) also can be interfaced with network platform 402 through PS gateway node(s) 418. In an aspect, WAN(s) 460 can include a wireless WAN, which can embody a network platform (e.g., Network Platform 104) disparate from network platform 402, wherein the network platform disparate from network platform 402 can have substantially the same functional elements as network platform 402. Network interface(s) 495 enable the traffic exchange; such interface(s) can include conventional wireline or wireless links, or reference links specific to each of the external network(s) that interface with PS gateway node(s) 418, or other portions of the PS domain in network platform 402. In an aspect, PS gateway node(s) 418 can generate packet data protocol (PDP) contexts when a data session is established. To at least that end, in an aspect, PS gateway node(s) 418 can include a tunnel interface (e.g., tunnel termination gateway (TTG) in 3GPP UMTS network(s) (not shown)) which can facilitate packetized communication with disparate wireless network(s), which can be part of access network(s) 420 and can include Wi-Fi networks, femtocell network(s), macrocell network(s) and associated radio access network(s) (RAN(s)) based on various radio technology generations, etc. It should be further appreciated that packetized communication can include multiple flows of data that can be generated through server(s) 414, such as management server(s) (e.g., a provisioning server, a Mobile Switching Center (MSC)) or application server(s). It is to be noted that in 3GPP UMTS network(s), PS gateway node(s) 418 (e.g., GGSN) and tunnel interface (e.g., TTG) comprise a packet data gateway (PDG).

In network environment 400, network platform 402 also includes serving node(s) 416 that conveys the various packetized flows of data streams that can be directed to device(s) 428, and that are received through PS gateway node(s) 418 from server(s) 414. In turn, server(s) 414 can receive the communication(s), such as request for data intended to service network(s) 490, which can include an IMS core or other packet-based cores, from user equipment within device(s) 428 or network elements (e.g., customized routing server 420 requests presence information from a HSS). As an example, in a 3GPP UMTS network, serving node(s) 416 can be embodied in serving GPRS support node(s) (SGSN). As another example, in a 3GPP LTE network, service node(s) 416 can be embodied in one or more Mobility Management Entities (MMEs).

Server(s) 414 can operate in various layers of network platform 402. For example, server(s) 414 can operate as part of Operations Support Systems (OSS), Business Support Systems (BSS), or network subsystems such as IMS core network. Server(s) 414 can execute numerous applications, which can include consumer-oriented application(s), such as messaging services, location services, online gaming, wireless banking, or system-oriented applications, e.g., wireless device management, scheduling or queuing of network traffic, or the like. Such application(s), either consumer-oriented or system-oriented, can generate sets of packetized data streams or flows, and manage (e.g., schedule, queue, format . . . ) such flows. In an aspect, a server within server(s) 414 can be a Domain Name Server (DNS) that executes one or more service-oriented applications that can supply a logical address (e.g., an IP address) of a serving node within serving node(s) 416. The logical address of the serving node can be supplied in response to a request (e.g., a query) from a disparate serving node within serving node(s) 416 or serving node(s) that are part of a disparate network platform. Application(s) executed by server(s) 414 can include, for example, add-on features to standard services provided by network platform 402. Data streams generated by server(s) 414 can be conveyed to PS gateway node(s) 418 for authentication/authorization and initiation of a data session or for execution, at least in part, of a telecommunication procedure (Tracking Area Update procedure, Location Area Update procedure, Routing Area Update procedure, Attach procedure, etc.) for communication to device(s) 428 thereafter.

Server(s) 414 also can effect security (e.g., implement one or more firewalls) of network platform 402 to ensure network's operation and data integrity in addition to authentication and authorization procedures that CS gateway node(s) 412 and PS gateway node(s) 418 can enact. In addition, server(s) 414 can implement timing protocols (e.g., Network Time Protocol (NTP)) that supply timing framework(s) for various operation(s) of network platform 402. Moreover, server(s) 414 can provision services from external network(s), e.g., WAN 460, LAN(s) 470, IMS core network, which can be part of service network(s) 490, or Global Positioning System (GPS) network(s) (not shown). Server(s) 414 can include one or more processors (not shown) configured to provide or that provide, in part, the functionality of network platform 402. To that end, the one or more processors (not shown) can execute one or more sets of computer-executable code instructions (not shown) stored in memory 440, for example.

In example network environment 400, memory 440 can store information related to operation of network platform 402. Information can include content(s), such as subscriber-generated content or from various other sources; subscriber account(s) and associated credential(s); pricing schemes, e.g., promotional rates, flat-rate programs, couponing campaigns; and so forth. In addition, memory 440 can store information from at least one of telephony network(s) 450, WAN(s) 460, LAN(s) 470, signaling network 480, or service network(s) 490. While illustrated as a single entity, memory 440 can be distributed amongst one or more of the described external networks, server(s) 414, or other functional elements of network platform 410. Memory 440 can be embodied at least in part in a VLR, a HSS, or storage available within a consolidated data repository that centralizes data (administrative data, operational data, etc.) for at least network platform 402.

Figure 5:
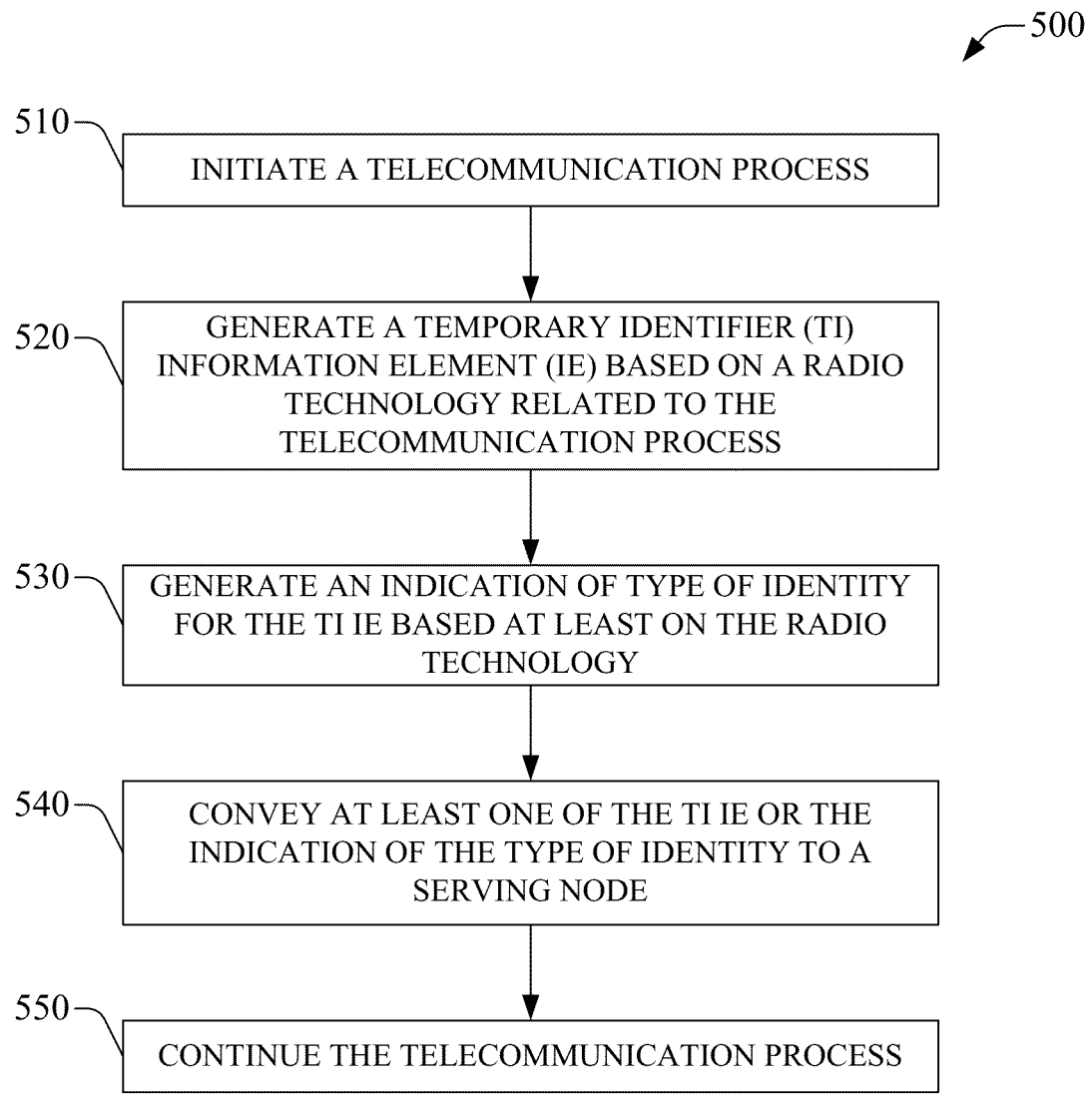
FIG. 5 is a flowchart of an example method for supplying a temporary identifier (TI) in a wireless network in accordance with aspects described herein.
Figure 6:
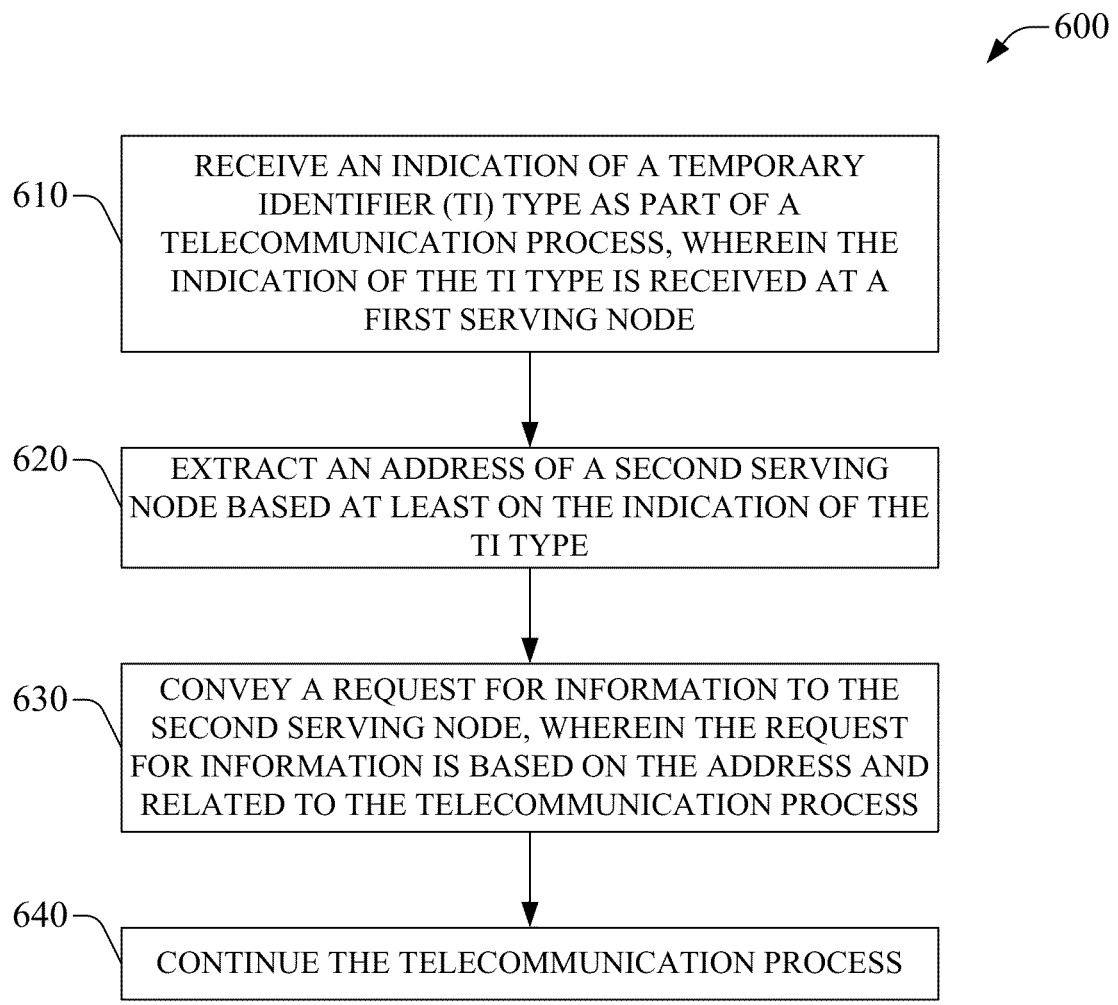
FIG. 6 displays a flowchart of an example method for distinguishing a non-native temporary identifier from a native TI within a wireless network in accordance with aspects described herein.
Figure 7:
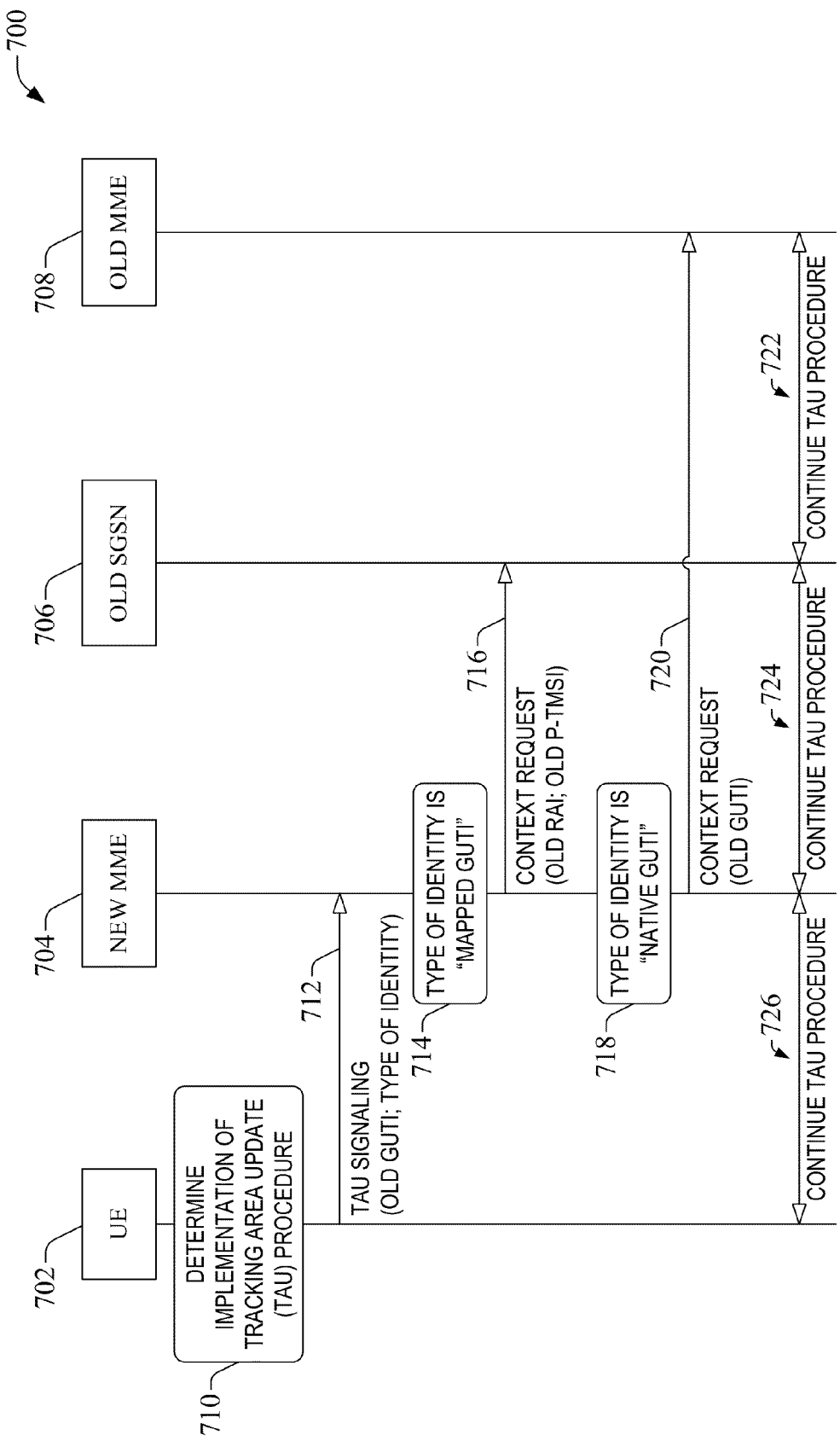
FIG. 7 represents a call flow of a method for distinguishing a GUTI within a Tracking Area Update (TAU) procedure according to aspects described herein.

In view of the example system(s) or device(s) described above, example method(s) that can be implemented in accordance with the disclosed subject matter can be better appreciated with reference to flowcharts in FIGS. 5-6 and call flow in FIG. 7. For purposes of simplicity of explanation, methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more methods disclosed herein could alternatively be represented as a series of interrelated states or events, such as in a state diagram. Moreover, interaction diagram(s) or call flow(s) may represent one or more methods described herein in accordance with the disclosed subject matter when disparate entities enact disparate portions of the one or more methods. Furthermore, not all illustrated acts may be required to implement a described method in accordance with the subject specification. Further yet, two or more of the disclosed methods can be implemented in combination, to accomplish one or more features or advantages described herein.

Methods disclosed throughout the subject specification and annexed drawings are capable of being stored on an article of manufacture to facilitate transporting and transferring such methods to computers for execution, and thus implementation, by a processor or for storage in a memory. In an aspect, one or more processors, such as processor(s) that enact the method(s) described herein, can be employed to execute code instructions stored in a memory, or any computer-readable or machine-readable storage medium, to implement method(s) described herein—the computer-executable code instructions provide a computer-executable or machine-executable framework to enact the method(s) described herein.

FIG. 5 is a flowchart of an example method 500 for supplying a temporary identifier (TI) in a wireless network in accordance with aspects described herein. User equipment (e.g., UE 110 or UE 210) can implement (e.g., execute) the subject example method. One or more processors also can perform the subject example method. In an aspect, the one or more processors can provide, at least in part, the functionality of the user equipment or component(s) therein. In an aspect, the one or more processors can execute one or more components within the UE to perform at least one act of the subject example method when such one or more components are embodied in a set of computer-executable code instructions that are part of a software application or a firmware application. At act 510 a telecommunication process is initiated. At act 520 a temporary identifier (TI) information element (IE) is generated based at least on a radio technology related to the telecommunication process. In an aspect, the TI identifies the UE that enacts the subject example method 500. At act 530, an indication (e.g., a classifier) of type of identity is generated for the TI IE. In an aspect, generating the indication of type of identity for the TI IE can include encoding a set of N bits in a field within the TI IE, where N is a natural number. In an example embodiment, for N=3, the generating can include encoding the three bits to a value of "111" in bits 3 to 1 in the Type of Identity field in scenarios in which the TI IE is embodied in the EPS Mobility Identity IE defined in the 3GPP LTE Rel. 8 standard. In another example embodiment, for N=3, the generating can include encoding the three bits to a value of "101" in bits 3 through 1 in the Type of Identity field in scenarios in which the TI IE is embodied in the EPS Mobility Identity IE. The value "111" or the value "101" can represent a "Mapped GUTI" type of identity. In another aspect, generating the indication includes associating a tag (e.g., a multi-bit word) to the TI IE, wherein the tag is not part of the TI IE; association of the tag to the TI IE can be based on a one-to-many relationship. At act 540, at least one of the TI IE or the indication of the type of identity is conveyed to a serving node (e.g., a serving node in the set of one or more serving node(s) 104). At act 550, the telecommunication process is continued.

FIG. 6 displays a flowchart of an example method 600 for distinguishing a non-native temporary identifier from a native TI within a wireless network in accordance with aspects described herein. A serving node that is part of a network platform (e.g., a core network (CN) in 3GPP LTE radio technology or 3GPP UMTS radio technology) associated with the wireless network can implement (e.g., execute) the subject example method. One or more processors also can execute the subject example method 600. In an aspect, the one or more processors can provide, at least in part, the functionality of the serving node or component(s) therein. In an aspect, the one or more processors can execute one or more components within the serving node to perform at least one act of the subject example method 600 when such one or more components are embodied in a set of computer-executable code instructions that are part of a software application or a firmware application.

At act 610, an indication of a TI type is received as part of a telecommunication process, wherein the indication of the TI type is received at a first serving node. The first serving node can be embodied in the serving node that implements (e.g., executes) the subject example method 600. The telecommunication process can be one of the various telecommunication processes described supra.

At act 620, an address of a second serving node is extracted based at least on the indication of the TI type. The address of the second serving node can be a logical address, such as an internet protocol (IP) address. In an aspect, the extracting includes decoding the indication of the TI type, wherein the decoding can include decoding a multi-bit field within a TI IE (e.g., GUTI IE) that conveys a value of a TI associated with the indication of the TI type. As an example, the decoding can include extracting a 3-bit value (e.g., 111 or 101) in a received EPS Mobility Identity IE that conveys the TI type is a "Mapped GUTI". In addition, in certain embodiments, decoding the indication of the TI type includes identifying a tag and associated value. For an indication that conveys that the TI value linked to the indication is part of a domain of values intrinsic to the radio technology utilized by the first serving node that receives the indication, extracting the address is based on decoding the TI value. In an example embodiment, for a first serving node (e.g., a MME) that operates in accordance with 3GPP LTE radio technology and that receives an indication of type of TI that conveys the TI value is native to 3GPP LTE radio technology, extracting the address includes decoding a MME Group ID and a MME Code, as defined in standardized protocol(s) (e.g., 3GPP LTE Release 8), and identifying an IP address of a second serving node. In contrast, for an indication that conveys that the TI value linked to the indication is part of a domain of values non-intrinsic to the radio technology utilized by the first serving node that receives the indication, extracting the address includes mapping a received TI value (e.g., GUTI) to an identifier value (e.g., RAI+P-TMSI) in a domain of the radio technology of the serving node, and identifying a second serving node based at least on the identifier value. The first serving node can implement the mapping according to a radio technology standard protocol (e.g., 3GPP LTE Rel. 8 protocol(s)) or according to a custom mapping procedure based on specific features of architecture of wireless networks that include the first serving node (MME, SGSN, etc.) and the second serving node (MME, SGSN, etc.).

In an example embodiment, the first serving node implements (e.g., executes) act 620 and in so doing, the first serving node exploits, at least in part, an external resolution server (e.g., a Domain Name Server, which can be part of server(s) 414). In such example embodiment, extracting the logical address of the second serving node based at least on the indication of the TI type includes accessing (e.g., querying) the external resolution server and receiving the logical address of the disparate serving node from the external resolution server in response to the accessing (e.g., in response to the querying). In an alternative example embodiment, the first serving node can execute a procedure, or method, that is internal to the first serving node in order to enact act 620. In such alternative example embodiment, extracting the address of the second serving node based at least on the indication of the TI type includes executing a method of identifying such address. As described supra, such method can be stored within a memory in the first serving node as one or more sets of computer-executable code instructions.

At act 630, a request for information is conveyed to the second serving node, wherein the request for information is based on the address and related to the telecommunication process. At act 640, the telecommunication process is continued.

Utilization of "Mapped GUTI" or other type-of-identity classifiers that disclose to a serving node a custom mapping to be exploited to extract a logical address of a disparate serving node allows completion of telecommunication processes, such as TAU update, in wireless networks wherein a range of LAC or other unique identifiers exceeds the range contemplated in conventional 3GPP LTE Rel. 8.

Figure 8:
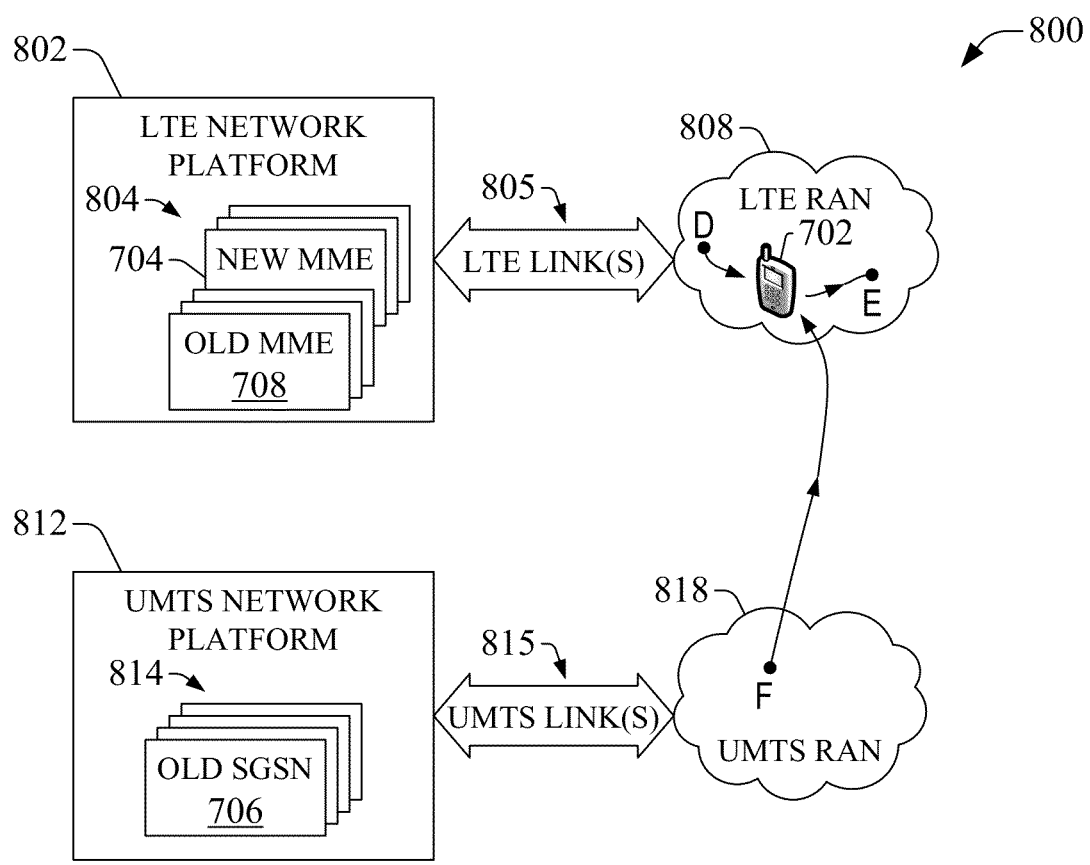
FIG. 8 presents an example wireless environment that enables characterization of Globally Unique Temporary Identifiers (GUTI) for UE in a telecommunication network in accordance with aspects described herein.

FIG. 7 represents a call flow of a method 700 for distinguishing a GUTI within a Tracking Area Update (TAU) procedure according to aspects described herein. The subject example method 700 is an illustration of a combination of example methods 600 and 700 in the scenario in which the telecommunication process is the TAU procedure. At act 710, UE 702 determines that TAU update procedure is to be implemented. In a first example scenario, when UE 702 determines that TAU procedure is to be implemented, UE 702 can operate or have a last network registration within an LTE wireless network, e.g., in location D within an LTE RAN 808 (see, FIG. 8). In a second example scenario, UE 702 can operate or have a last network registration within a UMTS wireless network, e.g., in location F, within a UMTS RAN 818. In response to such determination, TAU signaling is delivered to New MME 704 at act 712. In the first example scenario, New MME 704 can be linked (e.g., logically related) to location E; e.g., New MME 704 can serve (e.g., exchange traffic and signaling with) UE 702 in case UE 702 attaches to a base station related to location E, wherein the base station is functionally coupled to New MME 704. In the TAU procedure, the New MME 704 is an MME that is not part of the one or more tracking areas linked to UE 702; New MME 704 is an MME that can serve UE 702 after completion of the TAU procedure. New MME 704 can be part of a set of serving nodes 804 within LTE network platform 802; in an aspect, the set of serving nodes 804 embodies serving node(s) 104 and the LTE network platform 802 embodies network platform I 102, and link(s) 805 (S1 interface, S2 interface, X2 backhaul link, etc.) embody link(s) I 105. In addition, new MME 704 can embody the first serving node described in example method 600 supra. At act 714, New MME 704 determines that a received Type of Identity for Old GUTI is "Mapped GUTI", wherein Old GUTI is a TI of UE 702 when it operates in location D. As described supra, determining the type of identity includes decoding the Old GUTI IE and extracting a value of a Type of Identity field. Based on such value, an in the second example scenario, New MME 704 identifies Old SGSN 706 as a SGSN that serves (e.g., conveys traffic and control signaling to) UE 702 at or in proximity of location F prior and during the TAU procedure. Identifying Old SGSN 706 includes mapping received Old GUTI value to an Old RAI and an Old P-TMSI. At act 716, New MME 704 conveys a Context Request to Old SGSN 706. As illustrated, Old SGSN 706 can be part of a set of serving nodes 814 within UMTS network platform 812; in an aspect, the set of serving nodes 814 embodies serving node(s) 114, the UMTS network platform 802 embodies network platform II 112, and link(s) 815 (e.g., Iups interface) embody link(s) II 115. In addition, old SGSN 706 can embody the second serving node described in example method 600 supra. In the alternative, in the first example scenario indicate supra, in which New MME 704 determines, at act 718, that the received Type of Identity for Old GUTI is "Native GUTI", at act 720, New MME 704 conveys a Context Request to Old MME 708. The Old MME 708 is an MME that can serve (e.g., exchange traffic and control signaling with) UE 702 when the UE 702 operates at or in proximity of location E; such MME is associated with a set of areas linked to UE 702. New MME 704 identifies Old MME 708 via at least Old GUTI received in the TAU signaling. As illustrated in example wireless environment 800, Old MME 708 can be part of a set of serving nodes 804 within LTE network platform 802. Old MME 708 also can embody the second serving node described in example method 600. Acts 722, 724, and 726 enable to continue the TAU procedure.

Various advantages emerge from features or aspects of the one or more embodiments disclosed herein. As an example advantage, the various embodiments of the subject disclosure enable any LTE service provider that operates a legacy 3GPP wireless network (3GPP UMTS, 3GPP GPRS, etc.) and has assigned LAC values greater than a limiting value (e.g., 32,767) to the field of operations (sectors, base stations, etc.) to operate an LTE wireless network without updating their legacy 3GPP wireless network to comply with non-backward compatible requirement(s) in 3GPP LTE Rel. 8. As another example advantage, the various embodiments of the subject disclosure allow specifying various categories (via type-of-identify classifiers, for example) of GUTI in an LTE wireless network, one or more of such categories can be linked or associated (via a mapping, for example) with unique identifier domains in specific legacy wireless networks or advanced, private and semi-private networks. In addition, the such categories enable resolving MME Group ID issues described supra.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES- DRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ).

Additionally, various features of the subject innovation can be implemented in a computing device (a UE, a serving node, a server, etc.). Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
    receiving, by a system comprising a processor, an indication of a temporary identifier type as part of a telecommunication process; and
    determining, by the system, a logical address of a device based on decoding a multi-bit field of a temporary identifier information element related to a temporary identifier associated with the temporary identifier type,
    wherein the temporary identifier type indicates a radio technology utilized by the device to implement at least part of the telecommunication process.

2. The method of claim 1, wherein the multi-bit field comprises a three-bit value,
    wherein the temporary identifier information element is an evolved packet system mobility identity information element, and
    wherein the temporary identifier type is a mapped globally unique temporary identity.

3. The method of claim 1, wherein the determining further comprises identifying a tag linked to the temporary identifier and an associated value of the tag that facilitates identifying the temporary identifier type of the temporary identifier.

4. The method of claim 1, wherein the determining further comprises: decoding a temporary identifier value from the logical address,
    wherein the temporary identifier value is linked to the indication of the temporary identifier type and is part of a domain of values intrinsic to the radio technology utilized by the device that receives the indication of the temporary identifier type.

5. The method of claim 1, wherein the determining the logical address further comprises:
    mapping the temporary identifier value to an identifier value in a domain of the radio technology of the device; and
    identifying the device based at least on the identifier value.

6. The method of claim 2, wherein the three-bit value is 111.

7. An apparatus, comprising:
    a memory to store instructions; and
    a processor, coupled to the memory, that facilitates execution of the instructions to perform operations, comprising:
        receiving an indication of a temporary identifier type as part of a telecommunication process; and
        determining a logical address of a device based on the indication of the temporary identifier type,
    wherein the indication of the temporary identifier type is encoded in a multi-bit field of a temporary identifier information element related to a temporary identifier associated with the temporary identifier type, and
    wherein the indication of the temporary identifier type indicates a radio technology utilized by the device to implement at least part of the telecommunication process.

8. The apparatus of claim 7, wherein the operations further comprise decoding a value of the multi-bit field within the temporary identifier information element related to the temporary identifier associated with the temporary identifier type, and wherein the value enables determination of the logical address of the device.

9. The apparatus of claim 8, wherein the temporary identifier associated with the temporary identifier type is a globally unique temporary identifier and the globally unique temporary identifier is a combination of a routing area identifier and a packet-temporary mobile station identifier.

10. The apparatus of claim 8, wherein the multi-bit field comprises a three-bit value,
wherein the temporary identifier comprises a mapped globally unique temporary identity, and
wherein the information element comprises an evolved packet system mobile identity information element.

11. The apparatus of claim 10, wherein the three-bit value is 111.

12. The apparatus of claim 7, wherein the indication of the temporary identifier type comprises a tag, and
wherein a value of the tag enables the determining the logical address of the device.

13. The apparatus of claim 12, wherein the operations further comprise identifying the tag and determining the value of the tag.

14. The apparatus of claim 7, wherein the operations further comprise mapping a temporary identifier value linked to the indication of the temporary identifier type to an identifier value in a domain of identifier values for the radio technology utilized by the device.

15. The apparatus of claim 14, wherein the temporary identifier value is part of a domain of values non-intrinsic to a radio technology utilized by the apparatus.

16. A non-transitory computer-readable storage medium comprising computer-executable instructions stored thereon that, in response to execution cause a system comprising a processor to perform operations, comprising:

receiving an indication of a temporary identifier type as part of a telecommunication process; and
determining a logical address of a device based on identifying a tag and a value associated with the tag of the indication of the temporary identifier that facilitates identifying the temporary identifier type,
wherein the indication of the temporary identifier type indicates a radio technology utilized by the device to implement at least part of the telecommunication process.

17. The non-transitory computer-readable storage medium of claim 16, wherein the determining further comprises decoding the indication of the temporary identifier type, and
wherein the decoding includes decoding a multi-bit field within a temporary identifier information element related to a temporary identifier associated with the temporary identifier type.

18. The non-transitory computer-readable storage medium of claim 17, wherein the multi-bit field comprises a three-bit value,
wherein the information element is an evolved packet system mobility identity information element, and
wherein the temporary identifier type is a mapped globally unique temporary identity.

19. The non-transitory computer-readable storage medium of claim 16,
wherein the determining the logical address further comprises decoding the temporary identifier value.

20. The non-transitory computer-readable storage medium of claim 17, wherein the temporary identifier is specific to the radio technology utilized by the device.

* * * * *